(No Model.)
F. SCHARPF.
INSTRUMENT FOR THE FOCAL MEASUREMENT OF OPTICAL LENSES.
No. 327,602. Patented Oct. 6, 1885.
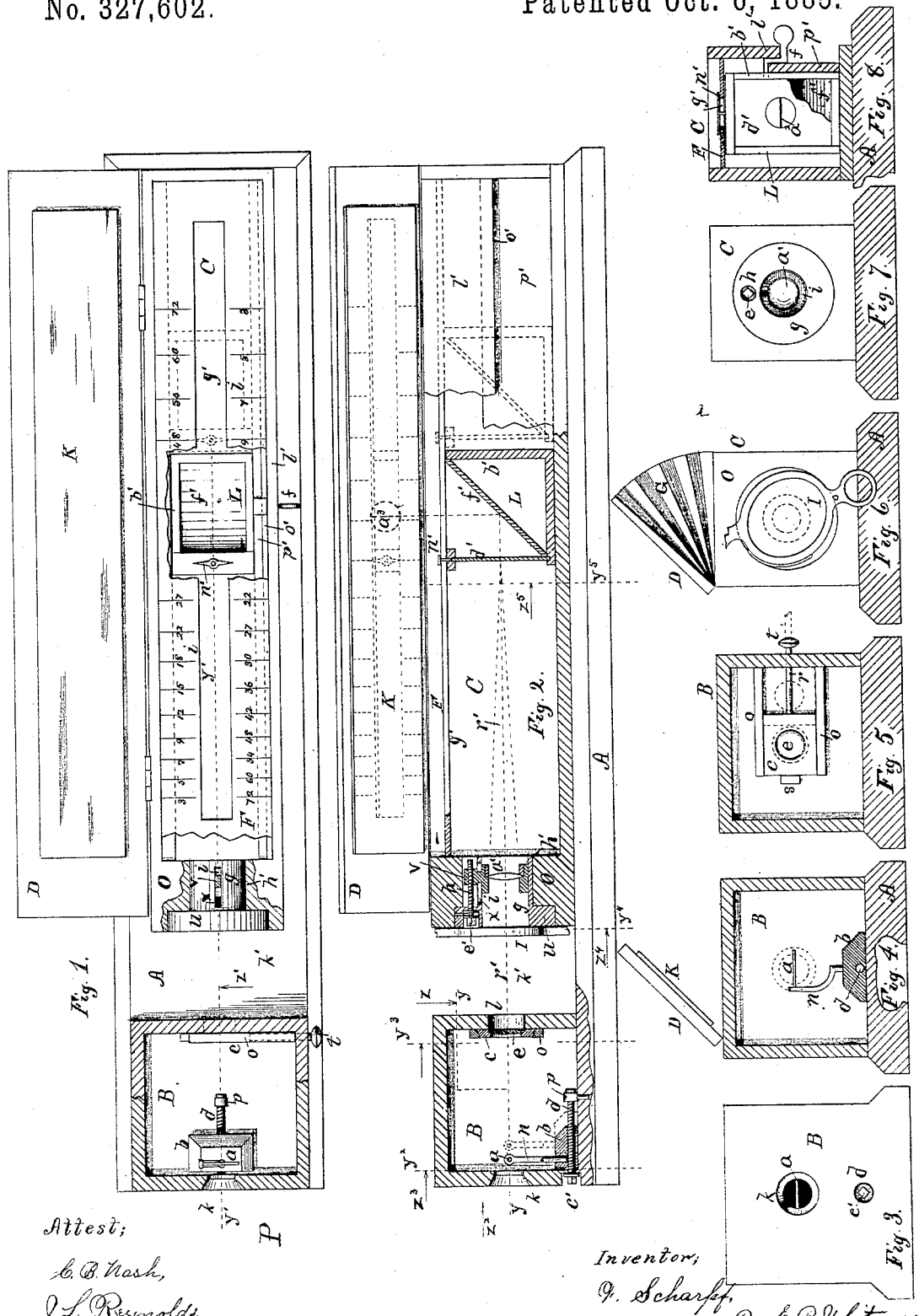
Attest:
C. B. Nash,
J. L. Reynolds.
Inventor:
F. Scharpf,
By E. B. Whitmore
Atty.

UNITED STATES PATENT OFFICE.

FREDERIC SCHARPF, OF ROCHESTER, NEW YORK, ASSIGNOR TO CHARLES F. YOUNG, OF SAME PLACE.

INSTRUMENT FOR THE FOCAL MEASUREMENT OF OPTICAL LENSES.

SPECIFICATION forming part of Letters Patent No. 327,602, dated October 6, 1885.

Application filed June 12, 1885. Serial No. 168,454. (No model.)

*To all whom it may concern:*

Be it known that I, FREDERIC SCHARPF, of Rochester, in the county of Monroe and State of New York, have invented a new and useful Improvement in Instruments for the Focal Measurement of Optical Lenses, which improvement is fully set forth in the following specification and shown in the accompanying drawings.

The object of my present invention is to produce an instrument for the focal measurement of eyeglasses and other optical lenses, and it is designed to be an improvement upon my previous similar inventions shown in Patents Nos. 196,028 and 236,911, of dates, respectively, October 9, 1877, and June 25, 1881.

The improvement consists in making the focusing-lens adjustable, in mounting the object so that it may be adjusted longitudinally, in forming the side of the scale-box through which the handle for the slide extends in such a manner that side light is excluded, in placing over the scale a mirror so inclined as to clearly show to the operator said scale, an index, and in forming the instrument with other improved parts and devices, all hereinbelow fully described, and more particularly pointed out in the claims.

Referring to the drawings, Figure 1 is a plan of my improved instrument for the focal measurement of optical lenses showing the cover thrown back, the box holding the cross-wire and other parts being horizontally sectioned, as on the broken dotted line $y$ in Fig. 2, and viewed as indicated by arrow $z$ in said figure, a part at the adjacent end of the scale-box being horizontally and centrally sectioned to show the lens-tube, and a part of the scale being broken away to uncover the slide, the latter being shown in full and dotted line positions, parts not essential to the figure being omitted; Fig. 2, a side elevation of the instrument, showing the cover as being inclined at an angle of about forty-five degrees to the plane of the scale, the cross-wire box, a part of the scale-box, the slide, lens-tube, and other parts being centrally and vertically sectioned, as on the dotted line $y'$ in Fig. 1, and viewed, as indicated by arrow $z'$, drawn to show the relative position of the lenses and mirrors, parts being broken away and other parts shown in various positions of adjustment by full and dotted lines, parts of the device being wholly omitted; Fig. 3, an end elevation of the same viewed as indicated by arrow $z^2$ in Fig. 2, drawn more particularly to show the orifice through which the light passes and the horizontal wire crossing the same; Fig. 4, a cross-section of the cross-wire box, taken on the dotted line $y^2$ in Fig. 2 and viewed as indicated by arrow $z^3$, drawn to show more fully the cross-wire and manner of holding the same, the orifice at the outer end of the box appearing in Fig. 3 being shown in dotted circles; Fig. 5, a similar view of the device, being a cross-section of the box, taken on the dotted line $y^3$ in Fig. 2, drawn to show the lens and slide holding the same and the manner in which said slide and lens are designed to be moved laterally along ways provided therefor, said slide and lens and the rod or handle connected therewith being shown in two positions by full and dotted lines; Fig. 6, a view of the end of the scale-box, seen as indicated by arrow $z^4$ in Fig. 2, the base-board of the device being transversely sectioned, as on the dotted line $y^4$, the figure being drawn to show the screen for cutting off the light and the position occupied by the lens being measured; Fig. 7, a similar view of the scale-box with the lens to be measured and the screen for the light omitted, drawn to show the lens-tube with its contained lens; and Fig. 8 a transverse section of the scale-box, taken on the dotted line $y^5$ in Fig. 2 and viewed as indicated by the arrow $z^5$, drawn to show the slide carrying the mirror, image-glass, and bent handle connected with the slide and reaching outside of the box, a portion of the ground object-glass being broken away to uncover the mirror.

Referring to the parts, A is the base-board or base of the instrument; B, the box containing the cross-wire or object $a$, with other parts; C, the box for holding the scale F and slide L, said boxes B and C being mounted upon the base A, in line and secured rigidly thereto, there being a space, $k'$, left between them.

D is the cover of the scale-box, attached to the latter by ordinary hinges so as to be tilted thereon, the inner face of the cover being provided with a mirror, K.

L is a slide placed within the scale-box and fitted to be moved longitudinally therein under the scale, said slide being provided with a bent handle, $f$, reaching to a point outside the box.

$g$ is a lens-tube inserted horizontally in an orifice, $h'$, formed in the end $o$ of the scale-box next the object-box B, said tube containing a lens-slide, $i$, and traverse-screw $h$, for longitudinally adjusting said lens-slide within the tube.

$k$ is a circular opening formed through a wall of the box B, and $l$ a similar orifice through the opposite side of the box, which two orifices are opposite each other and the bore of the lens-tube $g$, so that a right line or ray of light, $r'$, passing through the centers of said orifices $k$ and $l$ would coincide with the axis of the lens-tube and be parallel with the sides and base of the instrument. The eye-glass or lens I, the focal distance of which is to be measured, is placed in a vertical position flat against the outer end of the lens-tube in the space $k'$, as shown in Figs. 2 and 6, the axis of the lens being made to coincide with the center line, $r'$, above mentioned, the same being the axis of the instrument. The cross-wire $a$ is held by a bent standard, $n$, within the object-box B, in position to cross horizontally and diametrically the orifice $k$, which standard is rigidly secured to a block or base, $b$, resting upon the base A of the instrument. A longitudinal screw, $d$, resting at its outer end in a wall of the box B, under the orifice $k$, and at its inner end in a support, $p$, secured to the base A, passes through and is threaded in the block $b$, by means of which screw the cross-wire or object may be longitudinally adjusted. A lens, $e$, is held within the box B, opposite the orifice $l$ thereof, in a slide, $c$, resting between ways $o$, secured to the inner face of the wall of the box, so as to be moved laterally along the same. A rod, $r$, connected with the slide $c$, passes out through the wall of the box, terminating in a handle, $t$, by means of which the operator may withdraw the lens from the orifice $l$ or place it opposite the latter, at pleasure, a stop, $s$, serving to limit the motion of the slide in an inward direction. The lens tube $g$ is formed with a ring or head, $u$, let into the thick end O of the scale-box, said tube being also formed with a longitudinal slot, $x$. A circular slide, $i$, for holding a lens, $a'$, is fitted adjustably to the interior of the tube $g$, and formed with a part, $v$, reaching out through the slot $x$, as shown, which part $g$ is longitudinally bored and threaded outside of the tube to receive a traverse screw, $h$, by means of which said lens may be longitudinally adjusted within the tube. The head $e'$ of the screw $h$ is squared to receive a wrench, and sunk into the ring $u$ of the tube, to be out of the way of a lens, I, when placed against the tube, as above stated, and the head $c'$ of the screw $d$ is likewise squared and sunk into the walls of the box B. The slide L is formed of a frame, $b'$, which frame supports in front a vertical disk of glass, $d'$, ground upon its outer or front surface, also a mirror, $f'$, inclined at an angle of forty-five degrees to the axis of the instrument. Just above the slide L the scale-plate F rests within the box C, the slide being permitted to move longitudinally within said box under the scale. The scale is formed with a central longitudinal slot, $g'$, and transverse graduation-marks $i'$ are carved on either side of said slot, each of which is designated by a number, the orders of the two series of numbers being reversed, the upper series being used in measuring the focal distance of a convex lens, and the lower series, as appearing in Fig. 1, being used in measuring a concave lens. The frame $b'$ of the slide is provided with an index, $n'$, for the scale pointed in both directions, used to indicate the position of the vertical object-glass $d'$ with reference to the scale, which indicates the scale-distance of said object-glass from the lens being measured. The index is placed directly over the object-glass.

When the lenses are all properly adjusted, and the object-glass brought to the focal point within the scale-box of the eyeglass or lens being measured, the image of the object $a$ will be clearly produced upon the ground surface of the object-glass, as shown at $a^2$ in Fig. 8, which image will be reflected by the inclined mirror $f'$ up through the slot $g'$ of the scale onto the long mirror K, as shown at $a^3$ in Fig. 2, appearing transversely thereupon. In practice after the lens to be measured is put in place, as above explained, the operator moves the slide L longitudinally within the scale-box until a position is found at which a distinct image of the object $a$ appears on the long mirror K, which proves to him that the ground surface of the vertical object-glass is exactly at the focal point of said lens. When the image appears thus well defined upon the mirror K, the reading of the scale as determined by the index gives the number of the lens. In use the device is placed with the end P directed toward a window or other point of strong light, and in order that the image may appear clear upon the mirror K it is necessary to exclude as much light as possible from the interior of the scale-box and from the object-glass and mirror $f'$, excepting what passes through the lenses. As a means to exclude the light therefrom, I interpose a folding screen, G, at the end of the box, attached to both the box and cover thereof. This screen expands and contracts like the sides of an accordion as the cover D is raised or lowered, and serves to cut off the strong light from the left of the instrument.

As above stated, the slide L is provided with a handle, $f$, rigidly secured thereto, reaching out through the front side of the scale-box, in convenient reach of the operator. This slide is designed to be moved longitudinally within the scale-box, on account of which it is necessary to have a slit formed in the side of the box to accommodate the handle in its various horizontal movements. To prevent light entering the scale-box through the slit for the handle, I form the front side of the box of two strips or pieces, $l'p'$, placing the former above and outside the latter and in position to partially overlap the same, as shown in Fig. 8. These strips are placed slightly apart to form an opening or slit, $o'$, (Figs. 1 and 2,) through which to pass the handle $f$, said handle being bent, as shown in Fig. 8, for the purpose. By this means a free motion of the slide and handle is permitted, while the light is not permitted to enter the box through the slit.

The adjustability of the object $a$ and lens $a'$, above described, is important, for it enables the optician to use scales in the instrument that are not exact copies of each other. If, for instance, the scale of the instrument become destroyed, and replaced by a new one slightly differently spaced, the readings thereon would be incorrect, and lenses tested with the instrument could not be accurately numbered. By adjusting the lens $a'$ and object $a$ the instrument may be adapted to scales that slightly differ in make, causing the readings upon the same to be correct—that is to say, to adapt a new and slightly-different scale to the instrument, a lens, I, of some known number—as, for instance, 48—is employed. Should the index not indicate 48 upon the scale when the slide L is adjusted to throw a well-defined figure of the object $a$ upon the mirror K, then by adjusting the lens $a'$ the location of the focus of the lens I may be changed at will. This will cause the image of the object to distinctly appear upon the long mirror when the slide is moved to a position at which the index points to the division-mark numbered 48. A slight movement of the lens $a'$ toward or from the lens I will require an increased movement of the slide L in a corresponding direction to cause a distinct image of the object to appear upon the mirror K. The same effect is produced by moving the object $a$ nearer to or farther from the orifice $k$. The adjustment of both the lens and object may be necessary, as either one alone may not prove sufficient to make the correction necessitated by the difference in the scales without moving it to an extreme position, which may be objectionable.

After the lens $a'$ and object $a$ are adjusted to suit any given scale, they are then not further disturbed, unless a new scale is to be fitted to the instrument.

What I claim as my invention is—

1. The box B of an instrument for measuring the focal distances of optical lenses, formed with opposing openings through opposite sides thereof, and provided with a lens, $e$, and an object, $a$, longitudinally adjustable therein, in combination with the scale-box C, joined to the box B, and formed with an opening opposite said openings in the box B, and provided with an adjustable lens, $a'$, and slide L, substantially as described.

2. In combination with the scale-box C of an instrument for the focal measurement of optical lenses, provided with a tilting cover, D, and scale F, a slide, L, provided with an object-glass, $d'$, inclined mirror $f'$, an index, $n'$, the cover D, having a reflecting-mirror, K, upon its inner surface, substantially as and for the purpose specified.

3. In combination with the scale-box C of an instrument for the focal measurement of optical lenses, provided with a tilting cover, D, and scale F, a slide, L, within the scale-box, provided with an object-glass, $d'$, inclined mirror $f'$, an index, $n'$, the cover D having a reflecting-mirror, K, upon its inner surface, said slide being provided with a handle, $f$, reaching to the exterior of the scale-box, and fitted to move longitudinally within the latter, substantially as described.

4. The combination, in an instrument for the focal measurement of optical lenses, of the scale-box C, provided with a tilting cover, D, and mirror K, a scale, F, and slide L, within the scale-box, said slide being provided with an object-glass, $d'$, inclined mirror $f'$, an index, $n'$, the scale-box being formed with an orifice, $h'$, and provided with a lens-tube, $g$, inserted therein, and an adjustable slide, $i$, for holding a lens, $a'$, fitted within the lens-tube, with means, substantially as shown, to adjust said lens-slide within the tube, substantially as and for the purpose set forth.

5. In combination with the scale-box C of an instrument for the focal measurement of optical lenses, a lens-tube, $g$, formed with a head or band, $u$, and longitudinal slot $x$, a lens-slide, $i$, fitted adjustably within the lens-tube, said slide being formed with a part, $v$, reaching out through the slot $x$, and an adjusting-screw fitted to the part $v$, substantially as shown and described.

6. In combination with the object-box B of an instrument for the focal measurement of optical lenses, formed with orifices $k$ and $l$, an adjustable cross-wire or object, $a$, held within the box by a standard, $n$, in position to cross centrally the orifice $k$, a block, $b$, for holding the standard $n$, and longitudinal adjusting-screw $d$, fitted to the block $b$, to move the cross-wire or object $a$ toward or from the orifice $k$; substantially as shown and described.

7. The scale-box C of an instrument for the focal measurement of optical lenses, having one side thereof formed with the overlapping parts $l'$ and $p'$, with a space, $o'$, between them, in combination with a slide, L, for the mirror and object-glass, fitted to move longitudinally within the scale-box, and bent handle $f$, for the slide occupying said space $o'$, and reaching to the outside of said scale-box, substantially as and for the purpose specified.

8. The combination, in an instrument for the focal measurement of optical lenses, of the scale-box C, provided with a tilting cover, D, mirror K, and scale F, and a slide, L, within the scale box for holding the object-glass, mirror, and index $n'$, for the scale, and a screen, G, for the light, substantially as shown.

FREDERIC SCHARPF.

Witnesses:
E. B. WHITMORE,
J. L. REYNOLDS.